G. P. LUCKEY.
SOLDER.
APPLICATION FILED MAR. 13, 1918.
1,333,666.
Patented Mar. 16, 1920.
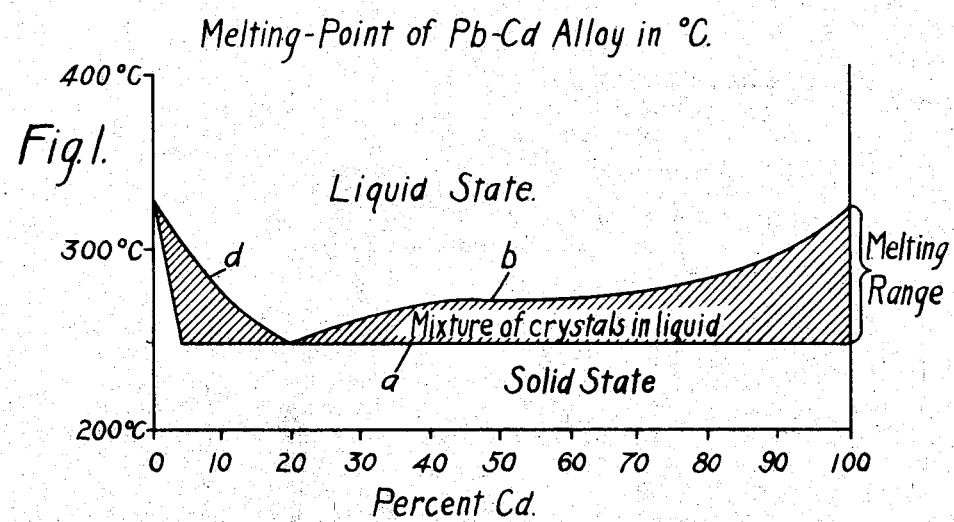
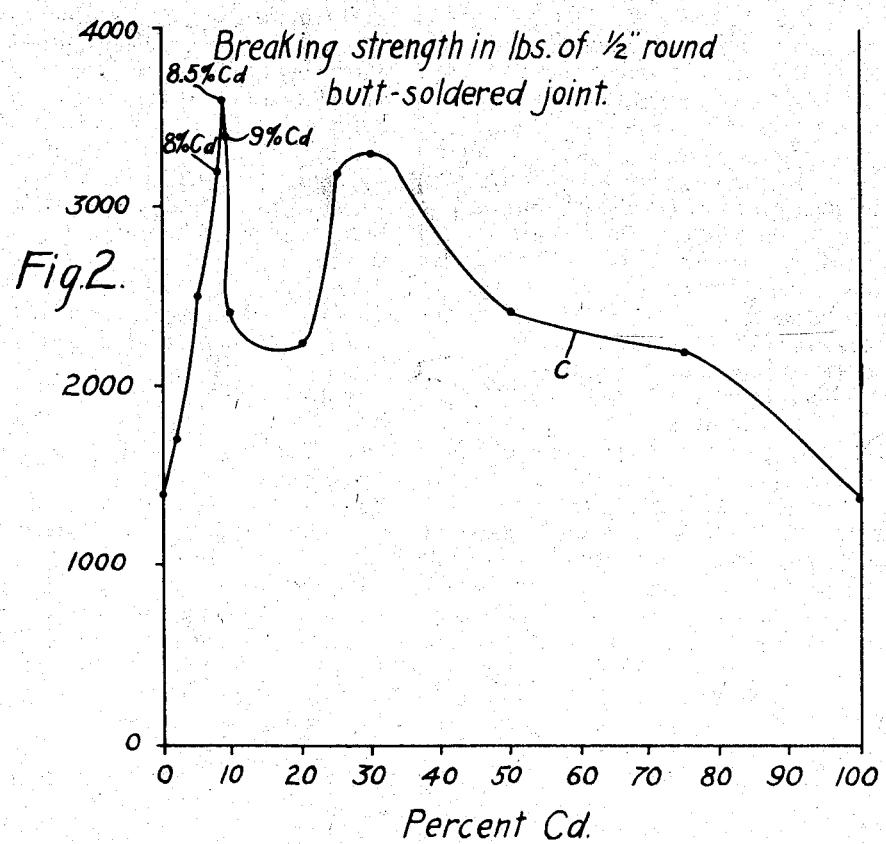
WITNESSES:
W. S. Reece
W. H. Woodman
INVENTOR
George P. Luckey
BY
Wesley G. Carr
ATTORNEY

UNITED STATES PATENT OFFICE.

GEORGE P. LUCKEY, OF WILKINSBURG, PENNSYLVANIA, ASSIGNOR TO WESTINGHOUSE ELECTRIC AND MANUFACTURING COMPANY, A CORPORATION OF PENNSYLVANIA.

SOLDER.

1,333,666.  Specification of Letters Patent.  Patented Mar. 16, 1920.

Application filed March 13, 1918. Serial No. 222,108.

*To all whom it may concern:*

Be it known that I, GEORGE P. LUCKEY, a citizen of the United States, and a resident of Wilkinsburg, in the county of Allegheny and State of Pennsylvania, have invented a new and useful Improvement in Solder, of which the following is a specification.

My invention relates to new and useful improvements in alloys and more particularly alloys for use as solders, and it has for its primary object the provision of a soldering alloy which melts at higher temperatures than the present commercial solders.

Among the various commercial solders known to me are the alloys of tin and lead, which have comparatively low melting points varying from 180° C. to the melting point of tin which is 232° C. There is no commercial solder having a melting point above that of tin except the so-called "brazes" which fuse at 600° C. or above.

There are certain uses, as, for example, soldering commutator leads in electric motors, in which the various commercial solders are unsatisfactory because the temperature of the soldered pieces, when in use, may approach the melting point of the particular solder employed. For instance, railway motors soldered with a lead-tin solder or with pure tin often become so hot that the solder is thrown out of the motor. It is, therefore, extremely desirable to have a solder having a higher melting point than that of pure tin but appreciably below the melting points of the "brazes."

I have found that alloys of lead and cadmium possess good soldering properties and that such alloys have melting points materially above the melting point of tin. The proportions of lead and cadmium, which may be employed in forming soldering alloys, may be considerably varied, changes in such proportions of course varying the melting point of the particular alloy formed and also affecting the strength of the soldered joints.

By actual tests, I have found that an alloy of lead and cadmium containing from approximately 6% to 10% cadmium gives a strong joint, even stronger than a similar joint made with a pure tin solder or any tin and lead solders. Furthermore, a solder of this character, such, for instance, as 8.5% cadmium and 91.5% lead has a melting point relatively high as compared with that of a lead-tin solder or a pure tin solder, beginning to melt at 249° C. and being completely melted at 280° C. Such a solder flows readily and, being not only stronger than a solder having tin as a base but also having a higher melting point, is capable of application over a wider range of service and, at more varied temperatures than tin or tin-lead solders. Furthermore, it is cheaper than a tin or a lead-tin solder, at present war prices.

In order to illustrate certain of the most important properties of my improved solder, using various proportions of the ingredients, I have shown, in Figure 1, a graphic representation of the various melting points of different-lead-cadmium solders and, in Fig. 2, a graphic representation of the breaking strength of a certain type of joint made with the same solders.

In Fig. 1, the lower line $a$ indicates the points, where melting begins, of a series of solders beginning at the left with pure lead and ending at the right with pure cadmium, while the upper line $b$ shows the temperatures at which complete melting of the same solders will take place.

In the lower diagram the curve $c$ indicates the breaking strength, in pounds, of ½-inch round butt-soldered joints formed with lead-cadmium solders ranging from pure lead to pure cadmium. As there indicated, the strengths of the joints obtained increase rapidly from pure lead, with additions of cadmium until an alloy having 8.5% cadmium and 91.5% lead is reached after which the strength falls away. Reference to Fig. 1 shows that at this same point, there indicated as $d$, the solder has a relatively high melting point, that is, a melting point of approximately 280° C.

From these diagrams it will be apparent that various soldering alloys of lead and cadmium, possessing different strengths and having different melting points, may be obtained and that the greatest strength is for alloys ranging between 4 and 10% cadmium and 96 and 90% lead.

Although I have suggested a particular soldering alloy consistsing of 6% to 10% cadmium and 94% to 90% lead, it will be appreciated that I do not impose any restrictions upon the proportions of the ingredients employed, other than those set forth in the claims.

I claim as my invention:

1. A solder comprising an alloy of lead and cadmium containing substantially 90% to 94% lead and 10% to 6% cadmium.

2. A solder comprising an alloy of substantially 8.5% cadmium and 91.5% lead.

In testimony whereof, I have hereunto subscribed my name this 19th day of Feb. 1919.

GEORGE P. LUCKEY.